United States Patent
Chan et al.

(10) Patent No.: US 11,423,716 B1
(45) Date of Patent: *Aug. 23, 2022

(54) TECHNOLOGY FOR DETECTING ONBOARD SENSOR TAMPERING

(71) Applicant: STATE FARM MUTUAL AUTOMOBILE INSURANCE COMPANY, Bloomington, IL (US)

(72) Inventors: Aaron Scott Chan, San Jose, CA (US); Kenneth J. Sanchez, San Francisco, CA (US); Gina Taylor, Champaign, IL (US); Saivikas Thalluri, Champaign, IL (US); Jie Yan, Urbana, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/933,377

(22) Filed: Jul. 20, 2020

Related U.S. Application Data

(63) Continuation of application No. 15/714,919, filed on Sep. 25, 2017, now Pat. No. 10,755,495.

(51) Int. Cl.
  *G07C 5/08* (2006.01)
  *G06F 11/32* (2006.01)
  *G07C 5/04* (2006.01)
  *G07C 5/00* (2006.01)

(52) U.S. Cl.
  CPC .......... *G07C 5/0816* (2013.01); *G06F 11/327* (2013.01); *G07C 5/008* (2013.01); *G07C 5/04* (2013.01); *G07C 5/085* (2013.01)

(58) Field of Classification Search
  None
  See application file for complete search history.

(56) References Cited

U.S. PATENT DOCUMENTS

| | | | |
|---|---|---|---|
| 5,586,130 A | * | 12/1996 | Doyle ............... G07C 5/008 |
| | | | 324/110 |
| 6,925,425 B2 | | 8/2005 | Remboski et al. |
| 8,738,523 B1 | | 5/2014 | Sanchez et al. |
| 8,954,340 B2 | | 2/2015 | Sanchez et al. |
| 8,989,959 B2 | | 3/2015 | Plante et al. |
| 9,501,878 B2 | | 11/2016 | Palmer et al. |
| 9,646,433 B1 | | 5/2017 | Sanchez et al. |

(Continued)

*Primary Examiner* — Navid Z. Mehdizadeh
(74) *Attorney, Agent, or Firm* — Marshall, Gerstein & Borun LLP

(57) ABSTRACT

Systems and methods detecting onboard sensor tampering are disclosed. According to embodiments, data captured by interior sensors within a vehicle may be analyzed to determine an indication that the activity of the vehicle operator either cannot be sufficiently detected or cannot be sufficiently identified using the captured data (e.g., that the captured data may be compromised). A date and time associated with the indication may be recorded, and a vehicle operator associated with the indication may be identified. A possible cause for the compromised data may be diagnosed, and notification may be generated indicating that the activity of the vehicle operator either cannot be sufficiently detected or cannot be sufficiently identified, and/or the possible cause. Additionally, a recommendation for restoring sensor functionality may be generated for the vehicle operator based the possible cause.

20 Claims, 6 Drawing Sheets

(56) References Cited

U.S. PATENT DOCUMENTS

| | | | |
|---|---|---|---|
| 9,685,010 | B1 | 6/2017 | Chan et al. |
| 10,163,018 | B1* | 12/2018 | Chan .................. G06Q 40/08 |
| 10,282,981 | B1 | 5/2019 | Nepomuceno et al. |
| 2001/0005804 | A1* | 6/2001 | Rayner .................. B60R 11/04 |
| | | | 701/32.6 |
| 2005/0137755 | A1 | 6/2005 | Chase et al. |
| 2007/0067079 | A1* | 3/2007 | Kosugi .................. G07C 5/085 |
| | | | 701/32.4 |
| 2007/0159309 | A1 | 7/2007 | Ito et al. |
| 2008/0243558 | A1 | 10/2008 | Gupte |
| 2008/0255718 | A1* | 10/2008 | Tuff .................. G07C 5/0858 |
| | | | 701/32.6 |
| 2009/0315723 | A1* | 12/2009 | Linsenmaier ............ G06T 7/97 |
| | | | 340/583 |
| 2011/0009107 | A1 | 1/2011 | Guba et al. |
| 2011/0035139 | A1 | 2/2011 | Konlditslotis et al. |
| 2012/0303392 | A1 | 11/2012 | Depura et al. |
| 2013/0024066 | A1 | 1/2013 | Geilen et al. |
| 2014/0148972 | A1 | 5/2014 | Basir et al. |
| 2014/0309806 | A1 | 10/2014 | Ricci |
| 2014/0309865 | A1 | 10/2014 | Ricci |
| 2016/0249191 | A1* | 8/2016 | Avrahami ................ H04W 4/12 |
| 2017/0010797 | A1 | 1/2017 | Lee |
| 2017/0067764 | A1 | 3/2017 | Skupin et al. |
| 2018/0143298 | A1* | 5/2018 | Newman ................ G08G 1/165 |

* cited by examiner

TECHNOLOGY FOR DETECTING ONBOARD SENSOR TAMPERING

CROSS-REFERENCE TO RELATED APPLICATIONS

This application is a continuation of U.S. patent application Ser. No. 15/714,929, entitled "Technology for Detecting Onboard Sensor Tampering," and filed Sep. 25, 2017, the disclosure of which is hereby expressly incorporated by reference herein in its entirety.

TECHNICAL FIELD

The present disclosure generally relates to technology for detecting onboard sensor tampering. More particularly, the present disclosure is directed to systems and methods for analyzing sensor data to determine that a sensor has been abused, tampered with, or otherwise compromised.

BACKGROUND

Individuals have been operating vehicles as a means of transportation for decades. Recently, vehicles have been equipped with certain computing components and devices. As vehicles incorporate more sensors, devices, and communication capabilities, it is increasingly easier to collect and analyze vehicle sensor data for various purposes. However, these sensors may sometimes be tampered with, abused, misused, or otherwise rendered inoperable. Due to such tampering or misuse, captured sensor data may be compromised and may yield inaccurate results, which may frustrate collection and analysis of data.

SUMMARY

A computer-implemented method in an electronic device for identifying interior vehicle sensor tampering is provided. The method may include receiving data captured by one or more interior sensors within a vehicle, analyzing, by a processor configured to detect and identify an activity of a vehicle operator, the data captured by the one or more interior sensors to determine an indication that the activity of the vehicle operator either cannot be sufficiently detected or cannot be sufficiently identified using the data captured by the one or more interior sensors, recording a date and time associated with the indication that the activity of the vehicle operator either cannot be sufficiently detected or cannot be sufficiently identified, identifying, by the processor, a vehicle operator associated with the indication that the activity of the vehicle operator either cannot be sufficiently detected or cannot be sufficiently identified, diagnosing, by the processor, a possible cause of the indication that the activity of the vehicle operator either cannot be sufficiently detected or cannot be sufficiently identified, generating one or more of a notification that the activity of the vehicle operator cannot be sufficiently detected or sufficiently identified, or a notification indicating the possible cause, generating an indication for the vehicle operator based on the possible cause, and transmitting a log of one or more of the indication that the activity of the vehicle operator either cannot be sufficiently detected or cannot be sufficiently identified, the date and time, the identity of the vehicle operator, or the possible cause.

In another aspect, an electronic device configured to identify interior vehicle sensor tampering is provided. The electronic device may include a transceiver configured to communicate data via at least one network connection, a memory configured to store non-transitory computer executable instructions, a processor configured to interface with the transceiver and the memory, and configured to execute the non-transitory computer executable instructions. The non-transitory computer-executable instructions may cause the processor to receive data captured by one or more interior sensors within a vehicle, analyze the data captured by the one or more interior sensors to determine an indication that the activity of the vehicle operator either cannot be sufficiently detected or cannot be sufficiently identified using the data captured by the one or more interior sensors, record a date and time associated with the indication that the activity of the vehicle operator either cannot be sufficiently detected or cannot be sufficiently identified, identify a vehicle operator associated with the indication that the activity of the vehicle operator either cannot be sufficiently detected or cannot be sufficiently identified, diagnose a possible cause of the indication that the activity of the vehicle operator either cannot be sufficiently detected or cannot be sufficiently identified, generate one or more of a notification that the activity of the vehicle operator either cannot be sufficiently detected or cannot be sufficiently identified, or a notification indicating the possible cause, generate an indication for the vehicle operator based on the possible cause, and transmit a log of one or more of the indication that the activity of the vehicle operator either cannot be sufficiently detected or cannot be sufficiently identified, the date and time, the identity of the vehicle operator, or the possible cause.

DETAILED DESCRIPTION

Figure 1A:
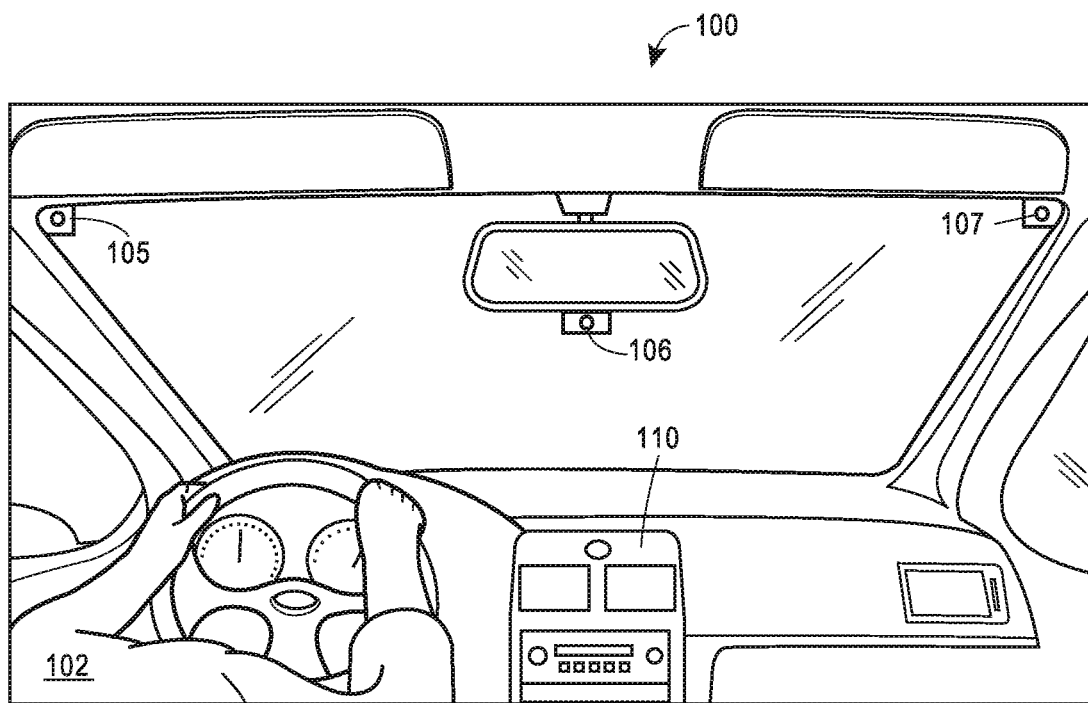
FIGS. 1A and 1B depict example environments within a vehicle including various components configured to facilitate various functionalities, in accordance with some embodiments.

The present embodiments may relate to, inter alia, technology for detecting onboard sensor tampering in a vehicle. According to certain aspects, systems and methods may receive data captured by one or more interior sensors within a vehicle and analyze the captured data to determine an indication that an activity (e.g., a behavior, movement, or gesture) of a vehicle operator (e.g., an automobile operator) either cannot be sufficiently detected or cannot be sufficiently identified using the data captured by the one or more interior sensors (e.g., that the sensor data is compromised in some way). Based on the indication of compromised data, a possible cause for the compromised data may be determined, and a notification may be generated alerting a vehicle operator that the sensor data may be compromised, a possible cause, and/or an indication of steps to take to restore sensor capabilities in the vehicle (e.g., a recommendation).

The systems and methods therefore offer numerous benefits. In particular, the systems and methods effectively and efficiently determine that data captured by onboard sensors is compromised in some way, and provide indications, including possible causes, to the vehicle operator accordingly. These indications may be recommendations that may help a vehicle operator to realize, for instance, that an onboard sensor is blocked, or that an onboard sensor is broken. Thus, the operator may correct the problem and sensor capabilities may be restored. In embodiments, notifications and recommendations may be generated in real time, as soon as an indication of compromised data has been identified, allowing an operator to make corrections and restore sensor capabilities quickly and reducing the time in which sensor data may be compromised. It should be appreciated that other benefits are envisioned.

The systems and methods discussed herein address a challenge that is particular to vehicle operation. In particular, the challenge relates to maintaining the integrity of vehicle operator behavior data captured by interior vehicle sensors. For instance, interior vehicle sensors may be blocked by objects in the vehicle, or may be tampered with by vehicle operators or passengers. Using conventional methods, such blocking or tampering might go unnoticed by vehicle operators and other stakeholders (e.g., family members, insurance providers, etc.) for a long time. Compromised data may yield inaccurate results that might, for instance, skew the application of insurance policies, premiums, discounts, etc. that are based on the captured data. The systems and methods offer improved capabilities to solve these problems by dynamically receiving and analyzing interior sensor data to determine that the activity or behavior of the vehicle operator either cannot be sufficiently detected or cannot be sufficiently identified, and by generating and communicating notifications and indications of recommendations to the vehicle operator based on possible causes for a given indication of compromised data. Accordingly, vehicle operators following the instructions of the generated recommendations may restore sensor functionality. Further, because the systems and methods employ the collection, analysis, and transmission of data associated with vehicles, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture interior vehicle sensor data, analyze the data to determine that the activity or behavior of a vehicle operator either cannot be sufficiently detected or cannot be sufficiently identified, diagnose a possible cause for the compromised data, and generate and display notifications and recommendations, among other functionalities.

According to implementations, the systems and methods may support a dynamic, real-time or near-real-time analysis of any captured, received, and/or detected data. In particular, the electronic device may receive or capture vehicle interior sensor data in real-time or near real-time, and may automatically and dynamically analyze the captured data. The electronic device may also automatically and dynamically generate and communicate relevant notifications in real-time or near-real-time. In this regard, any individual who receives a notification is afforded the benefit of accurate and relevant data, and may, for instance, quickly act on a recommendation to restore sensor functionality.

FIG. 1A illustrates an example depiction of an interior of a vehicle 100 that may include various components associated with the systems and methods. It will be understood that the vehicle 101 may be any type of vehicle, such as, for example, an automobile, bus, truck, motorcycle, all-terrain vehicle, snowmobile, jet ski, golf cart, boat, or aircraft, or any other type of vehicle. In some scenarios, an individual 102 (e.g., a vehicle operator) may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include at least one of: a location module (e.g., a global positioning system (GPS) chip), image sensor, thermometer, electromagnetic radiation sensor, accelerometer, gyrosensor, force sensor, strain gauge, inclinometer, goniometer, ignition sensor, clock, speedometer, torque sensor, throttle position sensor, gyroscope, compass, yaw rate sensor, tilt sensor, steering angle sensor, brake sensor, and/or other sensors.

Figure 1B:
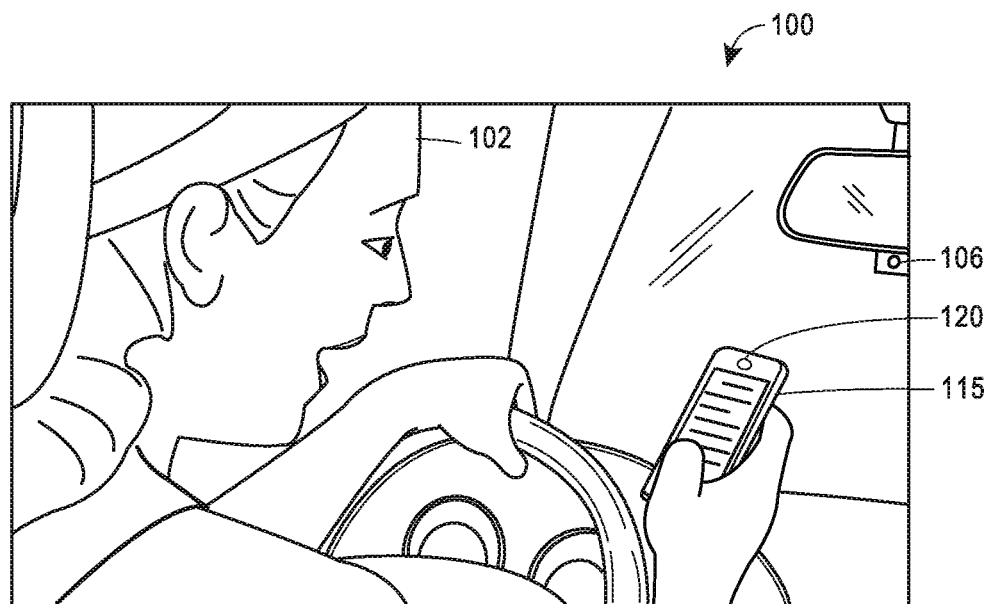

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. Additionally or alternatively, the electronic devices 110, 115 may analyze the image data to detect any movements made by the individual 102 that may be depicted in the image data, as well as determine or ascertain a state of the individual 102. Further, the electronic devices 110, 115 may further interface with the various sensors or other components to assess real-time environmental parameters associated with operation of the vehicle 100 (e.g., speed, location, route information, current time, current date).

Figure 1C:
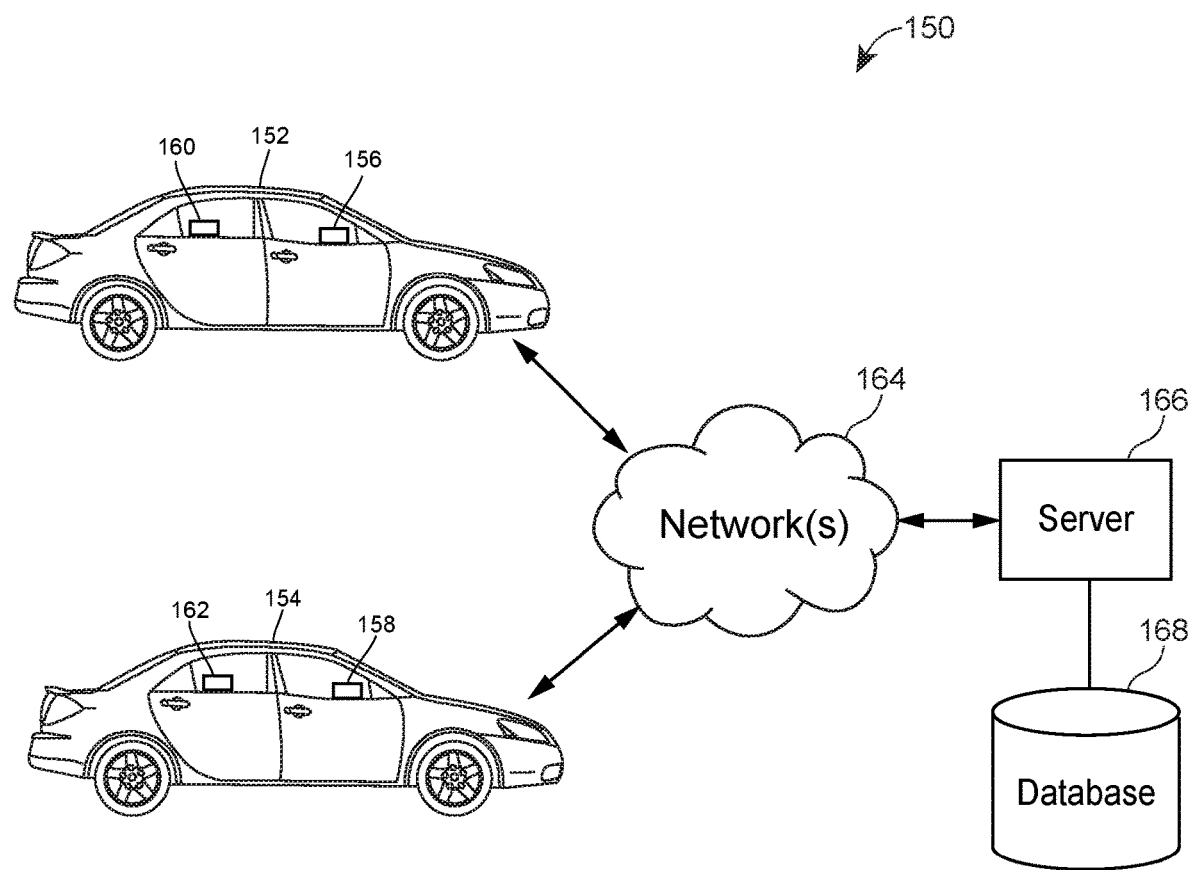
FIG. 1C depicts an example environment including vehicles and various components configured to facilitate various functionalities, in accordance with embodiments.

FIG. 1C illustrates a system 150 that includes a set of vehicles 152, 154. Although FIG. 1C depicts two (2) vehicles 152 and 154, it should be appreciated that fewer or additional vehicles are envisioned. The vehicle 152 may be configured or equipped with a set of electronic devices 156, 160, and the vehicle 154 may be configured or equipped with a set of electronic devices 158, 162. The electronic devices 156, 158, 160, 162 may be integrated within the respective vehicles 152 and 154 or may be separate from (but located within or in proximity to) the respective vehicles 152 and 154.

In some implementations, the electronic devices 160 and 162 may be included as part of an on-board diagnostic (OBD) system or any other type of system configured to be installed in the respective vehicle 152 and 154, such as an original equipment manufacturer (OEM) system. The electronic devices 160 and 162 may include a set of sensors configured to detect and record various telematics data associated with operation of the respective vehicles 152 and 154. In some implementations, the electronic devices 160 and 162 may be configured to communicate with (i.e., request, retrieve, and/or receive data from) a set of sensors disposed in other locations of the respective vehicles 152 and 154.

Further, in some implementations, the electronic devices 156 and 158 may be any type of electronic device such as a mobile device. For example, the electronic devices 156 and 158 may be smartphones associated with respective operators of the respective vehicles 152 and 154. It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic devices 156 and 158 may be configured to communicate and interface with the respective electronic devices 160 and 162. Further, although not depicted in FIG. 1C, the vehicles 152 and 154 and/or each of the electronic devices 156, 158, 160, 162 may be equipped with storage or memory capable of storing various data.

According to embodiments, the set of sensors included in any or all of the electronic devices 156, 158, 160, 162 or otherwise configured to communicate with any or all of the electronic devices 156, 158, 160, 162 may be of various types. For example, the set of sensors may include at least one of: a location module (e.g., a global positioning system (GPS) chip), image sensor, accelerometer, gyrosensor, force sensor, strain gauge, inclinometer, goniometer, ignition sensor, clock, speedometer, torque sensor, throttle position sensor, gyroscope, compass, yaw rate sensor, tilt sensor, steering angle sensor, brake sensor, and/or other sensors. The set of sensors may also be configured to detect various conditions of the vehicle operators, including various biometric information, movements, and/or the like.

Each of the electronic devices 156, 158, 160, 162 may be configured to communicate with at least one remote server 166 via one or more networks 164. It should be appreciated that various amounts of the remote server(s) 166 are envisioned. According to embodiments, the remote server(s) 166 may store data (i.e., may serve as a central repository) and/or exchange data with the electronic devices 156, 158, 160, 162. For example, the remote server 166 may store data or information associated with a set of locations, and may provide the data or information to the electronic devices 156, 158, 160, 162. The remote server 166 may also include logic or processing capabilities that may instruct the electronic devices 156, 158, 160, 162 to perform certain actions. The network(s) 164 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) 164 may also be one or more private or local networks or dedicated frequency bands. The network(s) 164 may enable the electronic devices 156, 158, 160, 162 and the remote server(s) 166 to communicate among each other in real-time or near-real time.

The remote server 166 may interface with a database 168 or other memory, which may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. According to embodiments, the database 168 may store various types of data received from the electronic devices 156, 158, 160, 162 via the network(s) 164. Further, in embodiments, the database 168 may store additional information received from the server 166 or from one or more additional servers (not shown in FIG. 1C).

In a particular implementation, one or more of the electronic devices 156, 158, 160, 162 associated with the vehicles 152 and 154 may accumulate or record telematics data during operation of the vehicles 152 and 154, and transmit the telematics data, via the network(s) 164, to the server(s) 166 for storage on the database 168. The telematics data may indicate, among other data, respective locations of the vehicles 152 and 154 (i.e., the locations of the vehicles 152 and 154 when the telematics data was accumulated or recorded).

Figure 2:
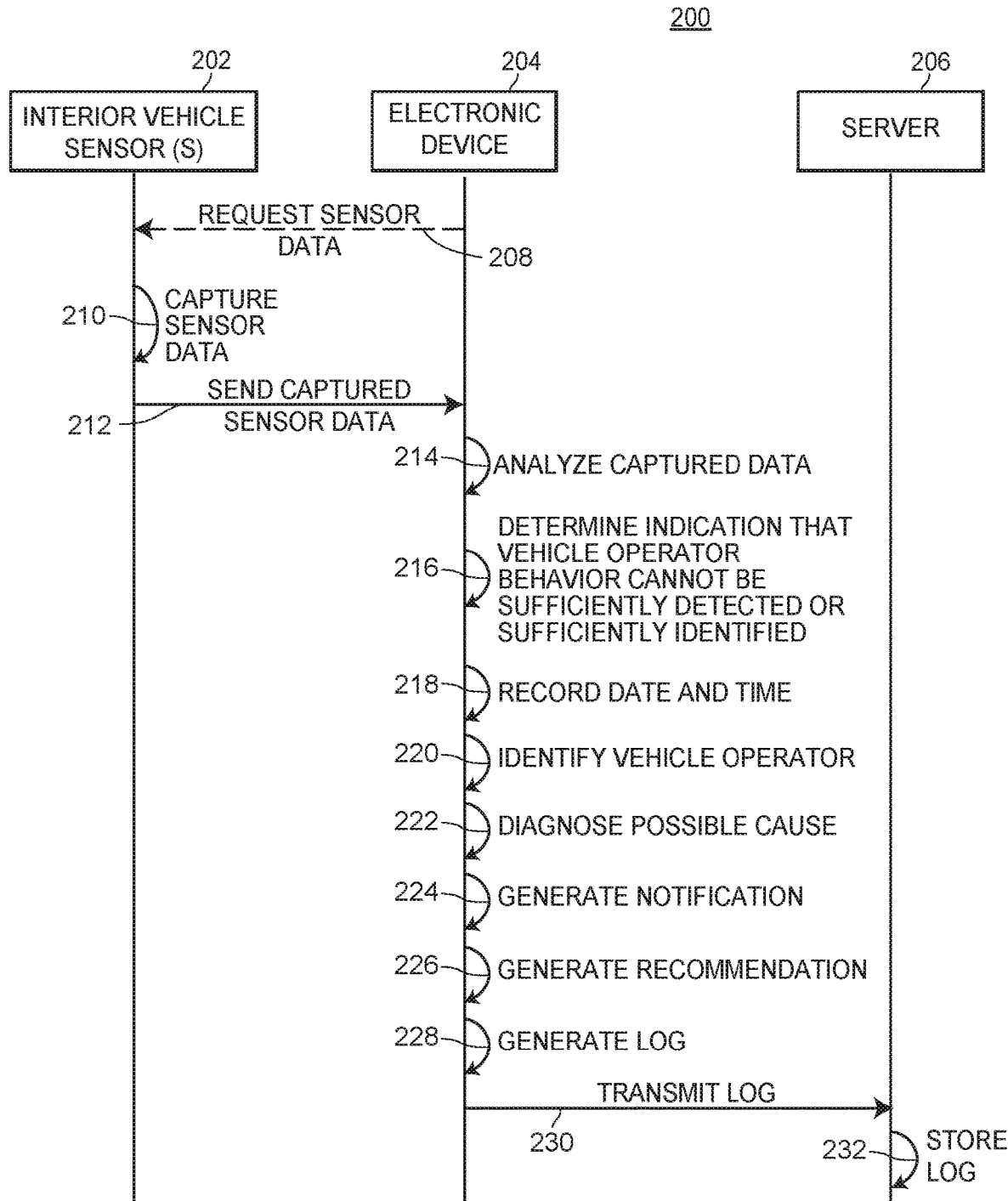
FIG. 2 depicts an exemplary signal diagram associated with technology for detecting onboard sensor tampering, in accordance with some embodiments.

FIG. 2 depicts a signal diagram 200 associated with facilitating certain functionalities of the systems and methods. The signal diagram 200 includes vehicle interior sensors 202, an electronic device 204, and at least one server 206. According to embodiments, the electronic device 204 may be located within a vehicle. Further, the electronic device 204 may be equipped with or configured to communicate with the vehicle interior sensors 202. Additionally, the electronic device 204 may be configured to communicate with the at least one server 206. It should be appreciated that additional or alternative components and devices are envisioned.

The signal diagram 200 may begin when the electronic device 204 optionally requests (208) sensor data from the interior sensors 202. According to embodiments, the electronic device 204 may automatically request the sensor data periodically (e.g., once every ten seconds, once every minute, once every hour), or a user of the electronic device 204 may cause the electronic device 204 to request the sensor data. Further, the request may include a specified amount of sensor data and/or a specific time component (e.g., real-time sensor data and/or sensor data detected five minutes ago). It should be appreciated that the interior sensors 202 may be internal to or external from the electronic device 204.

The interior sensors 202 may capture (210) sensor data. The interior sensors 202 may be, for example, image sensors, temperature sensors, electromagnetic radiation sensors, sound sensors, acceleration sensors, velocity sensors, or any other type of suitable interior vehicle sensor. The interior sensors 202 may accordingly capture data, e.g., image data, temperature data, electromagnetic radiation data, sound data, acceleration data, velocity data, etc. The interior sensors 202 may then send (212) the captured data to the electronic device 204. In one implementation, the interior sensors 202 may automatically send the captured sensor data to the electronic device 204 in real-time or near real-time as the interior sensors 202 capture the sensor data, and/or in response to a request from the electronic device 204. In another implementation, the interior sensors 202 may send previously-captured interior sensor data to the electronic device 204, such as if the interior sensors 202 interface with some type of memory or storage. It should be appreciated that image data detected by the interior sensors may depict a vehicle operator or passenger.

The electronic device 204 may analyze (214) the sensor data to determine (216) an indication that an activity (e.g., a behavior, movement, or gesture) of the vehicle operator either cannot be sufficiently detected or cannot be sufficiently identified using the data captured by the one or more interior sensors 202 (e.g., an indication that the interior sensor data is compromised). That is, the captured data may be compromised because an interior sensor 202 has been tampered with, is broken, is obfuscated, is not receiving power, or any other reason, to be discussed in greater detail below. For example, the electronic device 204 may be configured to analyze the data captured by one or more interior image sensors 202 to detect and identify one or more activities/behaviors of a vehicle operator or passenger. The electronic device 204 may identify an indication that an activity of the vehicle operator either cannot be sufficiently detected or cannot be sufficiently identified using the data captured by the one or more interior sensors 202 based on anomalies in the captured data. For instance, a period of driving (e.g., 15 minutes) during which no operator or passenger activity can be detected by an analysis of captured image sensor data may indicate that the interior image sensor data is compromised. Similarly, a period of driving during which a vehicle operator activity can be detected, but not sufficiently identified, by an analysis of sensor data may also indicate that the interior sensor data is compromised. As another example, if an analysis of image data captured by an interior image sensor 202 indicates a decreased image resolution within the scope of the image sensor, the image sensor may be compromised in some way.

Additionally, the electronic device 204 may determine an indication that an activity or behavior of the vehicle operator either cannot be sufficiently detected or cannot be sufficiently identified using the data captured by the interior sensors 202 when a particularly high temperature is captured by an interior sensor 202. For instance, when an interior sensor 202 captures data indicating a temperature exceeding a certain threshold (e.g., a threshold for sensor functionality), the high temperature may indicate that any other data captured by that interior sensor 202 (e.g., captured image data that may be analyzed to detect and identify vehicle operator activity/behavior) may be compromised. In other examples, an unusually high or low level of electromagnetic radiation captured by an interior sensor 202 may indicate that the sensor data is compromised (e.g., if the electromagnetic radiation detected by an interior sensor 202 is above a certain high threshold, or below a certain low threshold, any other data detected by that sensor may be compromised.)

In some embodiments, the electronic device 204 may determinate an indication that an activity of the vehicle operator either cannot be sufficiently detected or cannot be sufficiently identified using the data captured by the one or more interior sensors 202 when the interior sensors 202 capture inconsistent data within the same vehicle. That is, the captured data for interior sensors 202 within the same vehicle should generally be reasonably consistent, so deviations from such consistency may indicate that the data from one or more of the interior sensors 202 may be compromised and will not yield accurate results when analyzed to detect or identify vehicle operator activity or behavior. For example, if the data captured by an interior motion sensor 202 within the vehicle indicates motion over a certain period of time (e.g., from 3:00 p.m. to 3:15 p.m.), but a series of images captured by an interior image sensor 202 within the same vehicle indicate no movement during that same period of time, the data captured by one or more of the interior sensors 202 may be compromised. As another example, if one interior sensor 202 captures a different temperature than another interior sensor 202 within the same vehicle (e.g., one sensor indicates a temperature of 50 degrees while the other sensor indicates a temperature of 80 degrees) at the same time, the data from one or more of the sensors may be compromised. Similarly, if one interior sensor 202 captures a higher or lower electromagnetic radiation level than other interior sensors 202 within the same vehicle at the same time, the data from one or more of the interior sensors 202 may be compromised. Additionally or alternatively, if an interior sensor 202 captures data indicating that one or more power source (e.g., a plug or a battery) is missing, discharged, or otherwise not providing power to the sensor 202, that may also be an indication the interior sensor data may be compromised (e.g., if the sensor captures no data during a power-disabled period, or if the sensor activates a power-saving mode and captures less data). Of course, additional or alternative means may be envisioned for analyzing interior sensor data to determinate an indication that an activity of the vehicle operator either cannot be sufficiently detected or cannot be sufficiently identified using the data captured by the one or more interior sensors.

Based on the determination (216) of the indication that an activity of the vehicle operator either cannot be sufficiently detected or cannot be sufficiently identified using the data captured by the one or more interior sensors 202, the electronic device 204 may record (218) a date and/or time of the indication. Additionally or alternatively, the electronic device may identify (220) an operator of the vehicle at the date/time of the indication. This identification may be useful for distinguishing between multiple drivers on an insurance policy, or multiple family members who operate the same vehicle, for instance. The identification of the operator may be based on an analysis of the interior sensor data 202 at the date/time of the indication. For instance, data detected by an interior image sensor 202 may be analyzed by the electronic device 204 to identify facial features of an operator associated with the indication. In other embodiments, the electronic device 204 may identify the operator based on login credentials entered into the electronic device prior to the indication, or by any other suitable indication of operator identification.

The electronic device 204 may diagnose (222) a possible cause of the indication that the activity of the vehicle operator either cannot be sufficiently detected or cannot be sufficiently identified using the data captured by the one or more interior sensors 202. The diagnosis of a possible cause may be based on one such indication, or it may be based on a trend of such indications associated with a particular vehicle or vehicle operator. To match an indication with a possible cause, the electronic device may access a database containing indications that the activity or behavior of the vehicle operator either cannot be sufficiently detected or cannot be sufficiently identified using the captured data, along with corresponding possible causes. For instance, if the determined indication is that all points within the scope detected by an image sensor 202 contain the same depth, the possible cause may be that a photograph of the interior of the vehicle has been placed in front of the image sensor in order to "spoof" it. That is, while the data detected by the image sensor 202 may appear correct in some ways, the depth of the various known fixtures within the vehicle may be detected incorrectly. In this example, the database might have an entry: "all points within scope same depth" corresponds with "photo blocking sensor."

In another example, if the indication is that an abnormally low amount of light is detected by an interior sensor 202, the possible cause may be that a towel or cloth may be draped over the sensor 202. The database may include an entry: "very low light" corresponds with "towel over sensor." In another instance, if the indication is that the sensor 202 has not captured all data that should be within its scope (i.e., some data that should be captured may not have been captured), the possible cause may be that the sensor 202 is obfuscated in some way. Similarly, if the indication is that the sensor 202 has captured data within its entire scope but the resolution of the data is low (e.g., if image resolution is low for image captured by image sensors), the possible cause for the indication may be that fog or some other water damage has impacted the functionality of the sensor 202. In still other examples, if the indication is that the electronic device 204 or any of the sensors 202 have been unplugged, a battery has been removed, or a power source has otherwise been disconnected, the possible cause may be that an operator has been intentionally disabling system power. Of course, the foregoing are simply examples, and additional or alternative indications of compromised data, and/or corresponding possible causes for such indications, may be envisioned.

The electronic device 204 may generate (224) a notification indicating that the activity or behavior of the vehicle operator either cannot be sufficiently detected or cannot be sufficiently identified using the data captured by the one or more interior sensors, and/or the possible cause diagnosed at step 222. The notification may be displayed to, for instance, the vehicle operator or an insurance provider of the vehicle operator. The notification may be displayed on a user interface as discussed below with respect to FIGS. 3A and 3B.

The notification may be classified by a level of alert (e.g., yellow alert, red alert). In particular, the level of alert may be based on the severity of the compromised data or by the number of indications of compromised data. For instance, if no activity of a vehicle operator can be detected by analyzing the data captured by the one or more interior sensors 202, the sensor data may be severely compromised, resulting in a red alert, while if an activity of a vehicle operator can be detected but cannot not identified, the sensor data may be only somewhat compromised, resulting in a yellow alert. As another example, if for a given vehicle operator there have been many indications (e.g., ten indications) over a period of time (e.g., one day) that the activity/behavior of the vehicle operator either cannot be sufficiently detected or cannot be sufficiently identified using the data captured by the one or more interior sensors, a red alert may result, while if over a period of time (e.g., one day) there have been only a small number of such indications (e.g., two notifications) of compromised interior sensor data for the operator or vehicle, a yellow alert may result. In other embodiments, the alert level may be elevated based on the frequency of a particular possible cause of compromised interior sensor data for a particular vehicle or vehicle operator (e.g., many indications of compromised sensor data with a possible cause of "towel over sensor" for a given vehicle operator may increase the alert level from yellow to red). Of course, there may be any number of alert levels, with degree indicated by color, number, or any other suitable indication of degree, or there may be no alert level indicated in the notification.

The notification may include an option for a vehicle operator to comment, via a user interface, on the indication of compromised data and/or the possible cause diagnosed and indicated in the notification. For instance, if the diagnosed possible cause is that the sensor 202 is unplugged, the operator may have the option to comment that the sensor 202 had become unplugged accidentally (e.g., not intentionally). In another instance, if the diagnosed cause is that there is something obfuscating the sensor 202, the operator may comment that there is not in fact something obfuscating the sensor 202, i.e., the sensor 202 may be broken. In other examples, external heat or weather may affect the data captured by the sensor 202, and the operator may note that in a comment. The comment may be transmitted to an insurance provider, and insurance premiums and/or discounts may be adjusted accordingly.

The electronic device 204 may generate (226) an indication of a recommendation for the operator. The generated indication/recommendation may be displayed with the generated notification, or separately, and may be displayed on a user interface, e.g., the user interfaces discussed with respect to FIGS. 3A and 3B. In particular, a generated indication of the recommendation may correspond with a possible cause, and to match a possible cause with a generated recommendation, the electronic device may access a database containing possible causes along with generated recommendations. For example, if the diagnosed cause is that something may be obfuscating part of the scope of the sensor 202, the generated recommendation may be for the operator to remove whatever may be obfuscating the scope of the sensor 202. As another example, if the diagnosed cause is that the sensor 202 is unplugged, the generated recommendation may for the operator to plug the sensor 202 back in. As an additional example, if the diagnosed cause is that there is fog covering the sensor 202, the generated recommendation may be for the operator to wipe the fog from the sensor 202. A vehicle operator may have the option to comment on the recommendation via the user interface, as discussed above with respect to commenting on the notification.

The electronic device may generate (228) a log. The log may include information such as the indication that the behavior of the vehicle operator either cannot be sufficiently detected or cannot be sufficiently identified using the data captured by the one or more interior sensors 202, the time and date associated with the indication, the operator or vehicle associated with the indication, the possible cause, any notifications, indications and/or recommendations generated, severity level, any comments submitted by the vehicle operator, or any other relevant information. Additionally, information from the log (e.g., frequency of logged indications of compromised data, frequent possible causes, etc.) may be accessed when generating notifications for subsequent identifications of indications of compromised data, e.g., the log may accessed to determine trends when generating an alert level as discussed above.

The electronic device may transmit (230) the log to the server 206, which may store (232) the log. The stored log may subsequently be transmitted from the server back to the electronic device in certain embodiments. Additionally, the log may be accessed by stakeholders, e.g., vehicle operators, vehicle owners, or insurance providers. Data stored in the log may be useful for insurance providers, and insurance premiums and/or discounts may be adjusted based on data stored in the log.

Figure 3A:
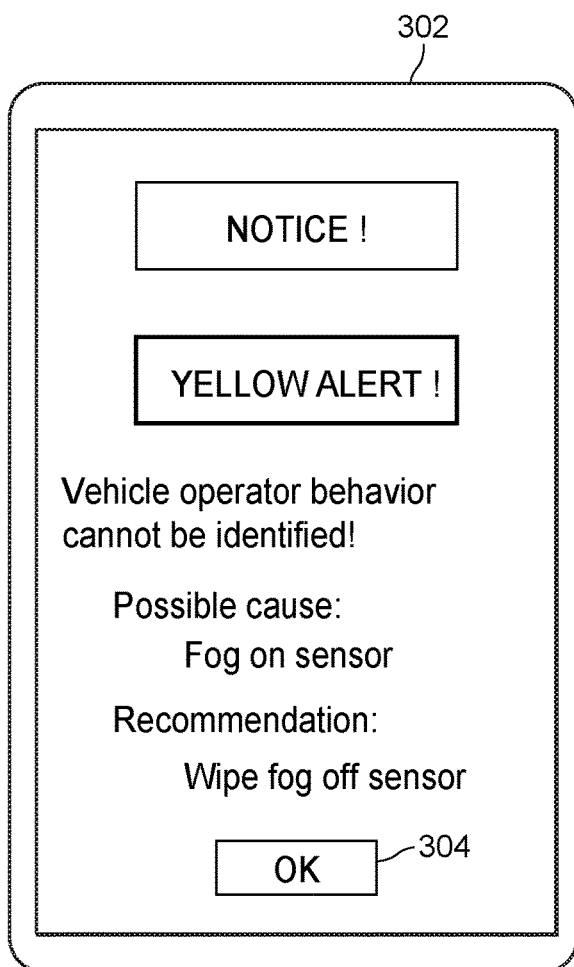
FIGS. 3A and 3B depict user interfaces associated with example notifications and visualizations, in accordance with some embodiments.
Figure 3B:
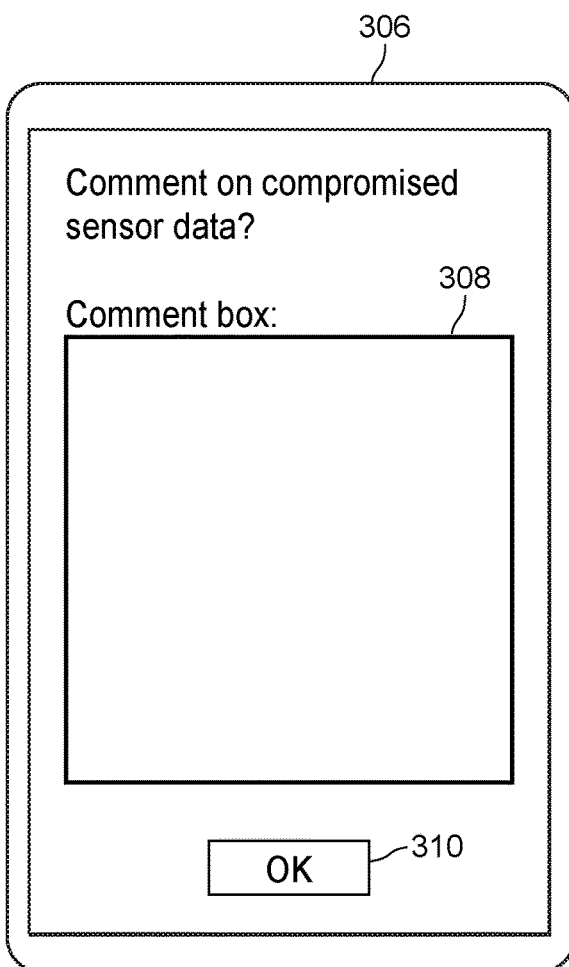

FIGS. 3A and 3B illustrate interfaces including example notifications. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely examples and that alternative or additional content is envisioned.

FIG. 3A illustrates an interface 302 that includes a notice indicating that the activity/behavior of the vehicle operator either cannot be sufficiently detected or cannot be sufficiently identified using the data captured by the one or more interior sensors, an alert level, and a diagnosed cause. While FIG. 3A depicts a "YELLOW ALERT," indicating a possible oddity, other embodiments might include a "RED ALERT" indicating a higher severity trend. Of course, any number of alert levels may be included in various embodiments. The interface 302 further indicates a generated suggestion or recommendation for a corrective action for the operator based on the diagnosed cause. As shown in this example, the diagnosed cause is that there is fog covering the sensor, so the interface 302 includes a recommendation to wipe the fog from the sensor. In other instances, if the diagnosed cause is something obfuscating part of the scope of the sensor, the interface 302 may include a recommendation to remove whatever may be obfuscating the scope of the sensor. As another example, if the diagnosed cause is that the sensor is unplugged, the interface 302 may include a recommendation to plug the sensor back in. The interface 302 includes an "OK" selection 304 that enables the vehicle operator to dismiss the interface 302.

FIG. 3B illustrates an interface 306 that that may proceed from interface 302 when a user selects "OK" (304). Interface 306 includes a comment box 308 that enables the vehicle operator to input a comment regarding the compromised sensor data. For instance, if the diagnosed cause is that the sensor is unplugged, the operator may comment that the sensor had become unplugged accidentally. In another instance, if the diagnosed cause is that there is something obfuscating the sensor, the operator may comment that there is not in fact something obfuscating the sensor, so the sensor must be broken (in order to appeal the diagnosed cause). In still another instance, the operator may comment that he or she has implemented a recommendation such as the recommendation shown in interface 304. The interface 304 includes an "OK" selection 310 that enables the user to upload a comment and/or dismiss the interface 304.

Figure 4:
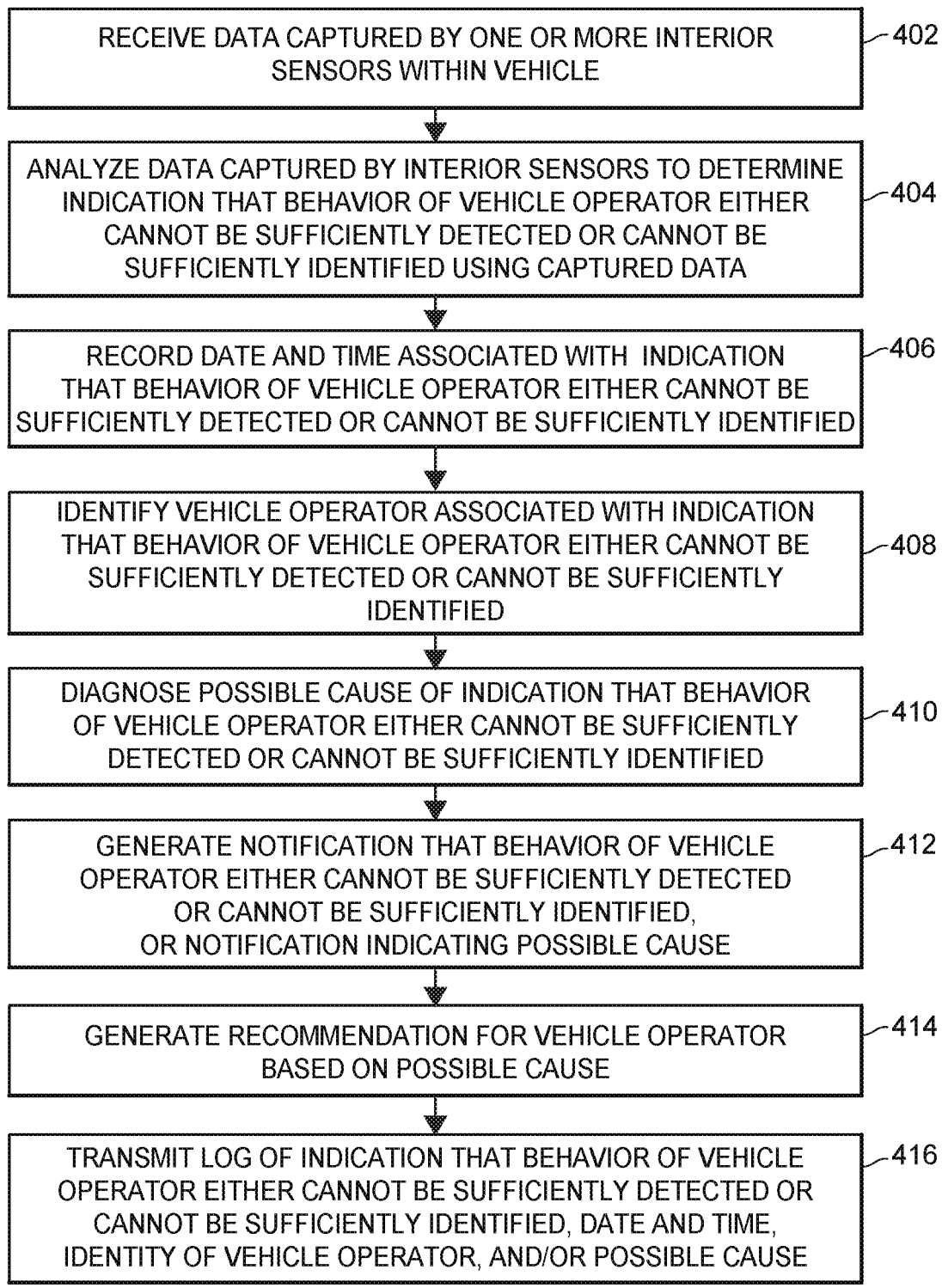
FIG. 4 depicts an exemplary flow diagram associated with technology for detecting onboard sensor tampering, in accordance with some embodiments.

FIG. 4 illustrates an exemplary flow diagram associated with technology for detecting onboard sensor tampering. The method 400 may be facilitated by an electronic device. The electronic device may support execution of a dedicated application that may facilitate the functionalities of the method 400. Further, the electronic device may enable the user to make various selections and facilitate various functionalities.

The method may begin by receiving (block 402) data captured by one or more interior sensors within a vehicle. In embodiments, the one or more sensors may be the same type of sensor or different types of sensors. The data captured by the interior sensors may be analyzed (block 404) to determine an indication that an activity or behavior of the vehicle operator either cannot be sufficiently detected or cannot be sufficiently identified using the captured data. For instance, an activity/behavior of the vehicle operator may be detected but not identified. In particular, a general motion or gesture indicating a behavior of the vehicle operator may be detected, but may not be sufficiently identified. When the behavior of the vehicle operator either cannot be sufficiently detected or cannot be sufficiently identified using the captured data, this may be an indication that a sensor has been abused or misused, or is otherwise inoperable.

In embodiments, the analysis of data captured by the one or more interior sensors to determine an indication that the activity of a vehicle operator either cannot be sufficiently detected or cannot be sufficiently identified may include analyzing the data captured by the one or more interior sensors by a processor to detect an activity of a vehicle operator. For instance, an activity may be a motion, gesture or behavior by the vehicle operator, or a sound made by a vehicle operator. The analysis may further include determining one or more possible identifications of the detected activity. Determining one or more possible identifications of the detected activity may be based on matching the captured data to database entries indicating various types of vehicle operator behaviors. For instance, captured image data may indicate movement of the vehicle operator and a mobile device proximate to the vehicle operator. Possible identifications of the detected behavior may be that the vehicle operator is texting using the mobile device, or that the vehicle operator is having a telephone conversation using the mobile device. The analysis may further include, however, determining that based on an analysis of the detected activity there is a low statistical confidence value (e.g., below a certain threshold value) or a high statistical error value (e.g., above a certain threshold value) for each of the one or more possible identifications of detected behavior. That is, a probability function associated with the possible identifications of the behavior may not indicate a sufficiently high probability of any of the possible identifications.

In other embodiments, an analysis of data captured by the one or more interior sensors to determine an indication that the activity/behavior of a vehicle operator either cannot be sufficiently detected or cannot be sufficiently identified may include receiving an indication that the vehicle is in motion but determining via an analysis of the captured data that no operator activity can be detected during some period of time while the vehicle is in motion. That is, when a vehicle is in motion, an assumption may be that there should be at least some activity by a vehicle operator—for instance, a behavior of steering the vehicle. Thus, if an analysis of captured interior sensor data indicates that no vehicle operator behavior is detected over a period of time (e.g., 15 minutes) while the vehicle is in motion, this may indicate that vehicle operator activity is occurring but has not been sufficiently detected using the captured sensor data for some reason (e.g., the interior sensor may have been abused, misused, tampered with, or may be otherwise inoperable).

In a similar embodiment, an analysis of data captured by the one or more interior sensors to determine an indication that the activity/behavior of a vehicle operator either cannot be sufficiently detected or cannot be sufficiently identified may include receiving an indication that the vehicle is in motion but determining that no movement is indicated by a series of images captured during a period of time while the vehicle is in motion. That is, when a vehicle is in motion, an assumption may be that there should be at least some movement captured by interior image sensors within the vehicle—for instance, movement of the steering wheel, or movement of the outside surroundings visible through vehicle windows. Thus, if an analysis of captured image sensor data indicates no movement during a period of time (e.g., 15 minutes) while the vehicle is in motion, this may indicate that the sensor may have been tampered with or is otherwise inoperable, and that the behavior of the vehicle operator cannot be sufficiently detected using the captured sensor data.

In another aspect, an analysis of data captured by the one or more interior sensors to determine an indication that the activity or behavior of a vehicle operator either cannot be sufficiently detected or cannot be sufficiently identified may include determining that the data captured by one or more of the interior sensors indicates a temperature greater than a certain threshold temperature. For instance, the threshold temperature may be a threshold temperature for sensor functionality (e.g., over 80 degrees the sensor will not capture data accurately). If the temperature captured by the sensor exceeds that threshold, for instance, the sensor may be incapable of capturing data that may be accurately analyzed to sufficiently detect or identify a vehicle operator behavior. Additionally or alternatively, the threshold temperature may be a threshold temperature for comfortable human driving (e.g., over 90 degrees a human may be uncomfortable driving a vehicle). If the temperature captured by the sensor exceeds that threshold while the vehicle is in motion, for instance, the high temperature may be an indication that the sensor is overheated due to some kind of tampering (e.g., covering the sensor with a cloth, causing it to overheat due to cloth in proximity to electronic components) and not because the vehicle interior is actually overheated (e.g., because a vehicle operator would likely take steps to cool a vehicle down if driving was uncomfortable). In a similar embodiment, determining an indication that the behavior of a vehicle operator either cannot be sufficiently detected or cannot be sufficiently identified may include determining that the data captured by the one or more interior sensors indicates a temperature difference between two of the interior sensors greater than a certain threshold. For instance, if the temperature captured by one sensor is different from the temperature captured by another sensor in the same vehicle by a certain amount (e.g., 15 degrees different), this may indicate that one of the sensors is overheated due to some kind of misuse (e.g., covering one sensor with a cloth but not another). In some instances, such tampering and/or misuse of interior sensors may render the interior sensors incapable of capturing data from which the activity of a vehicle operator may be detected or identified.

Additionally or alternatively, determining an indication that the activity or behavior of a vehicle operator either cannot be sufficiently detected or cannot be sufficiently identified may include determining that the data captured by one or more of the interior sensors indicates a level of electromagnetic radiation higher than a certain high threshold or lower than a certain low threshold. For instance, if the level of electromagnetic radiation (e.g., light, infrared, etc.) captured by an interior sensor is lower than a certain low threshold, this may indicate that the sensor has been blocked in some way (e.g., a cloth has been draped over the sensor, a piece of paper has been taped over the sensor, etc.), which may indicate tampering, misuse, or abuse of the sensor. As another example, if the level of electromagnetic radiation captured by an interior sensor is higher than a certain high threshold, this may indicate that the sensor has been adjusted from its original position (e.g., facing a vehicle operator) to face a light source (e.g., the sun, a light in the vehicle), which may indicate tampering, misuse, or abuse of the sensor. Additionally or alternatively, if the electromagnetic radiation captured by one sensor is different from that captured by another sensor by a certain threshold amount, this may indicate that one of the sensors has been covered and/or adjusted (e.g., covering one sensor but not another).

In some examples, such tampering and/or misuse of interior sensors may render the interior sensors incapable of capturing data from which the behavior of a vehicle operator may be sufficiently detected or identified.

In some embodiments, determining an indication that the activity or behavior of a vehicle operator either cannot be sufficiently detected or cannot be sufficiently identified may include analyzing images captured by the one or more interior image sensors to determine that one or more of the captured images indicate an image resolution below a certain threshold. For instance, if the captured images have a low image resolution (e.g., the images are blurry), the sensors may be incapable of capturing data from which the behavior of a vehicle operator may be sufficiently detected or identified.

In embodiments, the interior sensors may have both a main source of power (e.g., a plug) and a backup source of power (e.g., a battery). In such embodiments, determining an indication that the activity/behavior of a vehicle operator either cannot be sufficiently detected or cannot be sufficiently identified may include receiving an indication that either the main source of power or the backup source of power has been disabled. The indication that the main source of power has been disabled may be received from, for instance, a mechanism on the sensor hardware indicating whether the sensor is plugged in to a vehicle power port (e.g., a mechanical spring loaded mechanism that is activated when a plug is unplugged). When the main source of power is disabled, the backup power source may allow the sensor to continue to capture data, and vice versa. However, when a sensor power source is disabled (e.g., a vehicle operator intentionally unplugs a sensor), this may be an indication of sensor misuse, abuse, and/or tampering. In some examples, such tampering and/or misuse of interior sensors may render the interior sensors incapable of capturing data from which the activity of a vehicle operator may be sufficiently detected or identified. For instance, a power saving mode may be activated when one power source is disabled, and in such embodiments, the capability of a sensor to accurately capture data from which the behavior of a vehicle operator may be sufficiently detected or identified may be reduced. The number of times that a sensor power source is disabled over a period of time (e.g., sensor unplugged 10 times in one day), and/or the dates/times that such disablings occur (e.g., sensor unplugged on December $10^{th}$ at 1:15 p.m.) may be recorded. Additionally or alternatively, the time between a disabling and enabling of a main power source or a backup power source (e.g., sensor disabled for 30 minutes) for a certain sensor may be recorded.

At block 406, a date and/or a time associated with the indication that the activity or behavior of the vehicle operator either cannot be sufficiently detected or cannot be sufficiently identified may be recorded. At block 408, an operator of the vehicle, associated with the indication that the behavior of the vehicle operator either cannot be sufficiently detected or cannot be sufficiently identified, may be identified. The operator of the vehicle may be identified based on data captured by one or more of the interior sensors. For instance, an image sensor may capture an image of the operator, which may be used to identify the operator (e.g., using a facial recognition analysis). In other embodiments, a microphone sensor may capture the voice of the operator to be used for identification. In still other embodiments, the operator may be identified based on log-in credentials, such as a user name and password, or fingerprint, captured by the electronic device for use during a period in which the indication occurs (e.g., vehicle operator logs in using unique credentials at 3:00 p.m., indication occurs at 3:15, no other log-ins between 3:00 and 3:15). Of course, additional or alternative ways to identify the operator of the vehicle may be implemented.

At block 410, a possible cause may be diagnosed for the indication that the activity/behavior of the vehicle operator either cannot be sufficiently detected or cannot be sufficiently identified. The possible cause may be diagnosed based the data detected by one interior sensor or it may be based on the data detected by various of such interior sensors. Additionally, the possible cause may be diagnosed based on one indication that the activity of the vehicle operator cannot be sufficiently detected or cannot be sufficiently identified, or it may be based on a trend of such indications. The electronic device may access a database containing possible causes for various types of such indications in order to diagnose the possible cause, and may match the captured interior sensor data with a possible cause listed in the database.

At block 412, a notification may be generated indicating either that the activity/behavior of the vehicle operator cannot be sufficiently detected or cannot be sufficiently identified, or indicating the diagnosed possible cause. The notification may be displayed to a vehicle operator on a user interface of the electronic device. In particular, the notification may include an alert or warning related to the severity of the indication, the frequency of such indications, or any other suitable factor. Additionally or alternatively, the notification may be displayed to one or more stakeholder of the vehicle operator, such as an insurance provider. At block 414, an indication of a recommendation may be generated for the vehicle operator based the possible cause diagnosed for the indication that the behavior of the vehicle operator either cannot be sufficiently detected or cannot be sufficiently identified. The indication of the recommendation may include a suggested action for the vehicle operator or passenger to take in order to restore sensor functionality. The suggested actions, like the possible causes, may be accessed from a database connecting suggested actions with possible causes.

At block 416, a log may be transmitted including one or more of the indication that the activity/behavior of the vehicle operator either cannot be sufficiently detected or cannot be sufficiently identified, the date and time, the identity of the vehicle operator, or the possible cause of the compromised data. The log may be transmitted over a wired or wireless network to a server, where it may be accessed by, for instance, an insurance provider. Based on an indication that the activity of the vehicle operator either cannot be sufficiently detected or cannot be sufficiently identified, insurance premiums and/or discounts issued to vehicle operators based on behaviors detected/identified by analyzing captured interior vehicle sensor data may be adjusted accordingly.

Figure 5:
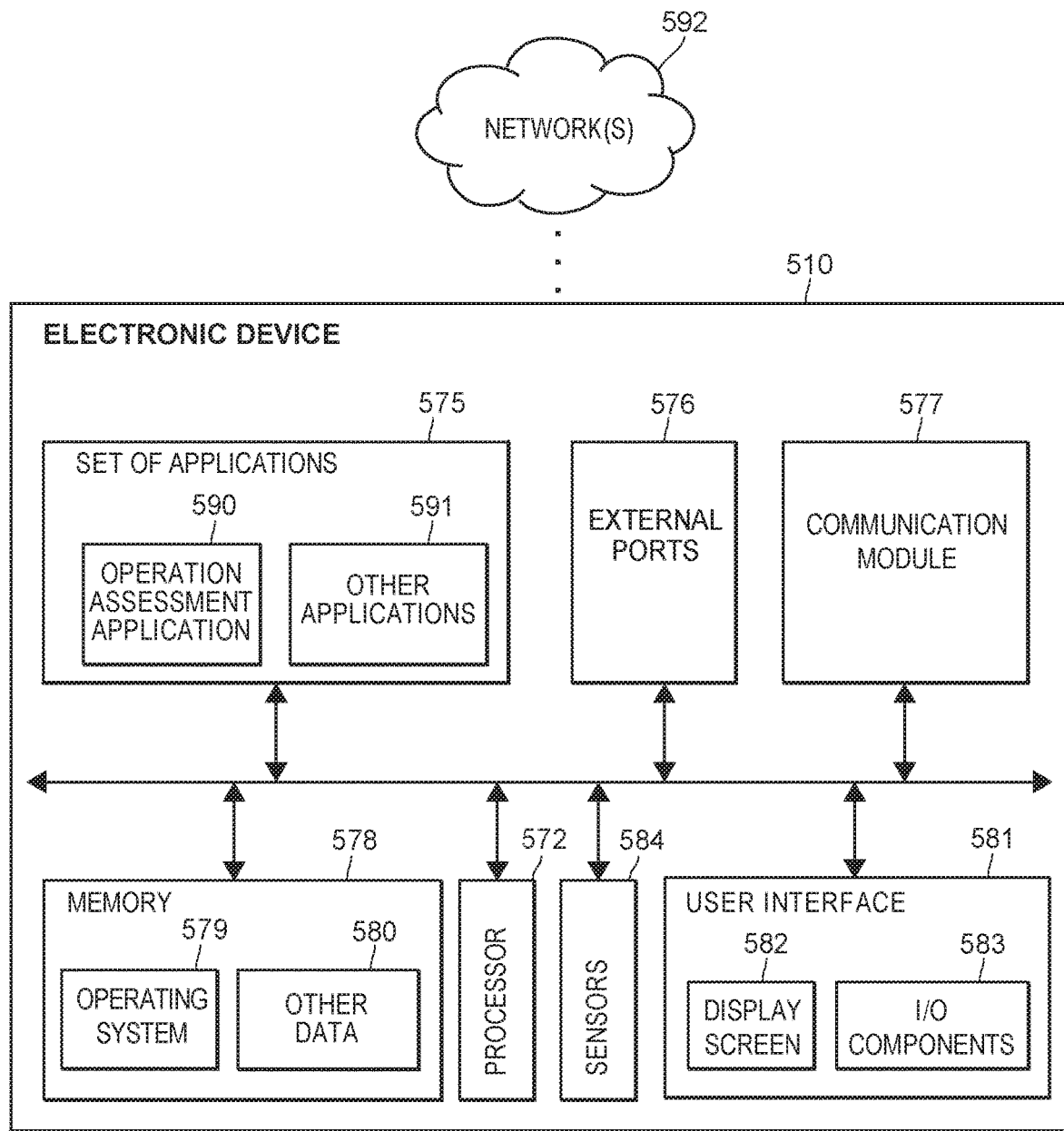
FIG. 5 depicts a block diagram of an exemplary electronic device, in accordance with some embodiments.

FIG. 5 illustrates a diagram of an exemplary mobile or other electronic device 510 (such as one of the electronic devices 110, 115, as discussed with respect to FIGS. 1A-1B, the electronic devices 156, 158, 160, 162 discussed with respect to FIG. 1C and/or the electronic device 202 discussed with respect to FIG. 2, for instance) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle. In an embodiment, the electronic device 510 may also be incorporated in a server, such as the remote server 166 as discussed with respect to FIG. 1C.

The electronic device 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an operation assessment application 590 configured to analyze data captured by interior sensors, determine indications that behavior of vehicle operator either cannot be sufficiently detected or cannot be sufficiently identified using captured data, diagnose possible causes, facilitate notification communication, etc. It should be appreciated that one or more other applications 591 are envisioned.

The processor 572 may interface with the memory 578 to execute the operating system 579 and the set of applications 575. According to some embodiments, the memory 578 may also include other data 580 that may include any data (e.g., image profile data, telematics data, location data, etc.) related to facilitating the functionalities as discussed herein. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 592. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 592, image data from a set of image sensors. For further example, the communication module 577 may transmit, via the network 592, generated logs to a remote server.

The electronic device 510 may further include a set of sensors 584. The processor 572 and the set of applications 575 may interface with the set of sensors 584 to retrieve and process the corresponding sensor data. The set of sensors 584 may include at least one of: a location module (e.g., a global positioning system (GPS) chip), image sensor, accelerometer, gyrosensor, force sensor, strain gauge, inclinometer, goniometer, ignition sensor, clock, speedometer, torque sensor, throttle position sensor, gyroscope, compass, yaw rate sensor, tilt sensor, steering angle sensor, brake sensor, and/or other sensors. The set of sensors may also be configured to detect various conditions of the vehicle operators, including various biometric information, movements, and/or the like. In one particular implementation, the operation assessment application 590 may use various data from the set of sensors 584 to facilitate certain functionalities.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method, the method comprising:
    analyzing, by a processor, data captured by one or more interior sensors associated with a vehicle to determine an indication that activity of a vehicle operator either cannot be detected or cannot be identified using the data captured by the one or more interior sensors;
    diagnosing, by the processor, a possible cause of the indication that the activity of the vehicle operator either cannot be detected or cannot be identified, wherein diagnosing includes determining, by the processor, based at least on a mechanical spring loaded mechanism that is activated when a plug is unplugged, whether a source of power for one or more of the interior sensors has been disabled; and
    generating one or more of a notification that the activity of the vehicle operator cannot be detected or identified, or a notification indicating the possible cause.

2. The method of claim 1, further comprising: identifying, by the processor, the vehicle operator associated with the indication that the activity of the vehicle operator either cannot be detected or cannot be identified.

3. The computer-implemented method of claim 2, wherein the data captured by the one or more interior sensors includes data captured by one or more interior image sensors or data captured by one or more interior microphone, and
    wherein identifying, by the processor, a vehicle operator associated with the indication that the activity of the vehicle operator either cannot be detected or cannot be identified comprises one or more of:
    analyzing, by the processor, the data detected by one or more of the interior image sensors to identify the vehicle operator at the time of the indication that the activity of the vehicle operator either cannot be detected or cannot be identified,
    identifying the vehicle operator associated with a most recent login credential provided to an electronic device associated with the vehicle at the time of the indication that the activity of the vehicle operator either cannot be detected or cannot be identified, or
    identifying the vehicle operator associated with a most recent voice recorded by the interior microphone at the time of the indication that the activity of the vehicle operator either cannot be detected or cannot be identified.

4. The computer-implemented method of claim 1, wherein analyzing the data captured by the one or more interior sensors to determine the indication that the activity of the vehicle operator either cannot be detected or cannot be identified using the data captured by the one or more interior sensors comprises:
    analyzing, by the processor, the data captured by the one or more interior sensors to detect an activity of the vehicle operator;
    determining, by the processor, one or more possible identifications of the detected activity of the vehicle operator;
    determining, based on analysis of the detected activity, a low statistical confidence value or a high statistical error value for each of the one or more possible identifications of the detected activity, wherein
    a low statistical confidence value is a statistical confidence value below a threshold statistical confidence value, and
    a high statistical error value is a statistical error value above a threshold statistical error value.

5. The computer-implemented method of claim 1, wherein analyzing the data captured by the one or more interior sensors to determine the indication that the activity of the vehicle operator either cannot be detected or cannot be identified using the data captured by the one or more interior sensors comprises:
    receiving, by the processor, an indication that the vehicle is in motion;
    analyzing, by the processor, the data captured by the one or more interior sensors; and
    determining that no operator activity can be detected during a period of time while the vehicle is in motion.

6. The computer-implemented method of claim 5, wherein the data captured by the one or more interior sensors includes image data, and wherein determining that no operator activity can be detected during a period of time while the vehicle is in motion comprises:
    analyzing, by the processor, the image data captured by the one or more interior sensors to determine that no movement is indicated by a series of images captured during a period of time while the vehicle is in motion.

7. The computer-implemented method of claim 1, wherein the data captured by the one or more interior sensors includes temperature data, and
    wherein analyzing the data captured by the one or more interior sensors to determine the indication that the activity of the vehicle operator either cannot be detected or cannot be identified using the data captured by the one or more interior sensors comprises:
    determining that the data captured by one or more of the interior sensors indicates a temperature greater than a threshold temperature, or
    determining that the data captured by the one or more interior sensors indicates a temperature difference between two of the interior sensors greater than a threshold temperature difference.

8. The computer-implemented method of claim 1, wherein the data captured by the one or more interior sensors includes electromagnetic radiation data, and
    wherein analyzing the data captured by the one or more interior sensors to determine the indication that the activity of the vehicle operator either cannot be detected or cannot be identified using the data captured by the one or more interior sensors comprises:
    determining that the data captured by one or more of the interior sensors indicates a level of electromagnetic radiation higher than a certain high threshold;
    determining that the data captured by one or more of the interior sensors indicates a level of electromagnetic radiation lower than a certain low threshold; or
    determining that the data captured by the one or more interior sensors indicates an electromagnetic radiation level difference between two of the interior sensors greater than a threshold electromagnetic radiation level difference.

9. The computer-implemented method of claim 1, wherein the data captured by the one or more interior sensors includes image data, and
    wherein analyzing the data captured by the one or more interior sensors to determine the indication that the activity of the vehicle operator either cannot be detected or cannot be identified using the data captured by the one or more interior sensors comprises:
    analyzing, by the processor, the images captured by the one or more interior image sensors to determine that one or more captured images indicate an image resolution below a threshold image resolution value.

10. The computer-implemented method of claim 1, wherein diagnosing, by the processor, the possible cause of the indication that the activity of the vehicle operator either cannot be detected or cannot be identified further comprises:
    accessing a database including indications that the activity of the vehicle operator either cannot be detected or cannot be identified using the data captured by the one or more interior sensors, and at least one corresponding possible cause for each indication; and
    identifying the possible cause corresponding to the indication determined by the processor.

11. An electronic device, comprising:
    a memory configured to store non-transitory computer executable instructions;
    a processor configured to interface with the memory, and configured to execute the non-transitory computer executable instructions to cause the processor to:
        analyze data captured by the one or more interior sensors associated with a vehicle to determine an indication that activity of a vehicle operator either cannot be detected or cannot be identified using the data captured by the one or more interior sensors;
        diagnose a possible cause of the indication that the activity of the vehicle operator either cannot be detected or cannot be identified, wherein diagnosing includes determining, based at least on a mechanical spring loaded mechanism that is activated when a plug is unplugged, whether a source of power for one or more of the interior sensors has been disabled; and
        generate one or more of a notification that the activity of the vehicle operator either cannot be detected or cannot be identified, or a notification indicating the possible cause.

12. The electronic device of claim 11, wherein the computer executable instructions further cause the processor to identify the vehicle operator associated with the indication that the activity of the vehicle operator either cannot be detected or cannot be identified.

13. The electronic device of claim 12, wherein the data captured by the one or more interior sensors includes data captured by one or more interior image sensors or data captured by one or more interior microphone, and wherein the computer executable instructions causing the processor to identify the vehicle operator associated with the indication that the activity of the vehicle operator either cannot be detected or cannot be identified using the data captured by the one or more interior sensors, further cause the processor to:
    analyze the data detected by one or more of the interior image sensors to identify the vehicle operator at the time of the indication that the activity of the vehicle operator cannot be detected or cannot be identified,
    identify the vehicle operator associated with the most recent login credentials provided to an electronic device associated with the vehicle at the time of the indication that the activity of the vehicle operator cannot be identified, or
    identify the vehicle operator associated with a most recent voice recorded by the interior microphone at the time of the indication that the activity of the vehicle operator either cannot be detected or cannot be identified.

14. The electronic device of claim 11, wherein the computer executable instructions causing the processor to analyze the data captured by the one or more interior sensors to determine the indication that the activity of the vehicle operator either cannot be detected or cannot be identified using the data captured by the one or more interior sensors, cause the processor to:
    analyze the data captured by the one or more interior sensors to detect an activity of the vehicle operator;
    determine one or more possible identifications of the detected activity of the vehicle operator;
    determine, based on analysis of the detected activity, a low statistical confidence value or a high statistical error value for each of the one or more possible identifications of the detected activity, wherein
    a low statistical confidence value is a statistical confidence value below a threshold statistical confidence value, and
    a high statistical error value is a statistical error value above a threshold statistical error value.

15. The electronic device of claim 11, wherein the computer executable instructions causing the processor to analyze the data captured by the one or more interior sensors to determine the indication that the activity of the vehicle operator either cannot be detected or cannot be identified using the data captured by the one or more interior sensors, further cause the processor to:
    receive an indication that the vehicle is in motion;
    analyze the data captured by the one or more interior sensors; and
    determine that no operator activity can be detected during a period of time while the vehicle is in motion.

16. The electronic device of claim 15, wherein the data captured by the one or more interior sensors includes data captured by one or more interior image sensors, and
    wherein the computer executable instructions causing the processor to determine that no operator activity can be detected during a period of time while the vehicle is in motion, further cause the processor to:
    analyze the data captured by the one or more interior image sensors to determine that no movement is indicated by a series of images captured during a period of time while the vehicle is in motion.

17. The electronic device of claim 11, wherein the data captured by the one or more interior sensors includes data captured by one or more interior temperature sensors, and
    wherein the computer executable instructions causing the processor to analyze the data captured by the one or more interior sensors to determine the indication that the activity of the vehicle operator either cannot be detected or cannot be identified using the data captured by the one or more interior sensors, further cause the processor to:

determine that the data captured by one or more of the interior sensors indicates a temperature greater than a threshold temperature, or determine that the data captured by the one or more interior sensors indicates a temperature difference between two of the interior sensors greater than a threshold temperature difference.

18. The electronic device of claim 11, wherein the data captured by the one or more interior sensors includes data captured by one or more interior electromagnetic radiation sensors, and wherein the computer executable instructions causing the processor to analyze the data captured by the one or more interior sensors to determine the indication that the activity of the vehicle operator either cannot be detected or cannot be identified using the data captured by the one or more interior sensors, further cause the processor to determine that the data captured by one or more of the interior sensors indicates a level of electromagnetic radiation higher than a certain high threshold;

determine that the data captured by one or more of the interior sensors indicates a level of electromagnetic radiation lower than a certain low threshold; or determine that the data captured by the one or more interior sensors indicates an electromagnetic radiation level difference between two of the interior sensors greater than a threshold electromagnetic radiation level difference.

19. The electronic device of claim 11, wherein the data captured by the one or more interior sensors includes data captured by one or more interior image sensors, and wherein the computer executable instructions causing the processor to analyze the data captured by the one or more interior sensors to determine the indication that the activity of the vehicle operator either cannot be detected or cannot be identified using the data captured by the one or more interior sensors, further cause the processor to:

analyze image data captured by the one or more interior image sensors to determine that the image data indicates an image resolution below a threshold image resolution value.

20. The electronic device of claim 11, wherein the computer executable instructions causing the processor to diagnose the possible cause for the indication that the activity of the vehicle operator either cannot be detected or cannot be identified using the data captured by the one or more interior sensors, further cause the processor to:

access a database including indications that the activity of the vehicle operator either cannot be detected or cannot be identified using the data captured by the one or more interior sensors and at least one corresponding possible cause for each indication; and identify the possible cause corresponding to the indication determined by the processor.

\* \* \* \* \*

UNITED STATES PATENT AND TRADEMARK OFFICE
CERTIFICATE OF CORRECTION

PATENT NO. : 11,423,716 B1
APPLICATION NO. : 16/933377
DATED : August 23, 2022
INVENTOR(S) : Aaron Scott Chan et al.

It is certified that error appears in the above-identified patent and that said Letters Patent is hereby corrected as shown below:

On the Title Page

At item (57), Line 16, "based" should be -- based on --.

In the Claims

At Column 21, Line 44, "method" should be -- computer-implemented method --.

At Column 25, Line 23, "processor to" should be -- processor to: --.

Signed and Sealed this
Eighteenth Day of July, 2023

Katherine Kelly Vidal
*Director of the United States Patent and Trademark Office*